United States Patent [19]

Maxwell, III

[11] Patent Number: 5,727,222
[45] Date of Patent: Mar. 10, 1998

[54] METHOD OF PARSING UNIFICATION BASED GRAMMARS USING DISJUNCTIVE LAZY COPY LINKS

[75] Inventor: John T. Maxwell, III, Cupertino, Calif.

[73] Assignee: Xerox Corporation, Stamford, Conn.

[21] Appl. No.: 572,393

[22] Filed: Dec. 14, 1995

[51] Int. Cl.$^6$ ................................................. G06F 17/27
[52] U.S. Cl. ................................................. 395/759
[58] Field of Search ................................. 395/759, 792, 395/793, 758

[56] References Cited

U.S. PATENT DOCUMENTS

| | | | |
|---|---|---|---|
| 5,438,511 | 8/1995 | Maxwell, III et al. | 364/419.01 |
| 5,642,519 | 6/1997 | Martin | 395/759 |

OTHER PUBLICATIONS

Bear, J. Feature-Value Unification with Disjunctions. Artificial Intelligence Center and Center for the Study of Language and Information, SRI International, Stanford, CA, 1987, pp. 1–8.

Dekkers, C. et al. Coping with Ambiguity in Decorated Parse Forests. Coping with Linguistic Ambiguity in Typed Feature Formalisms, Proc. of a Workshop held at ECAI 92, Vienna, Austria, Aug. 1992, pp. 11–19.

Dörre, J. et al. Determining Consistency of Feature Terms with Distributed Disjunctions. In Dieter Metzing, editor, GWAI–89, 13th German Workshop on Artificial Intelligence, Informatik Fachberichte 216, Springer–Verlag, 1989, pp. 270–279.

Eisele, A. et al. Unification of Disjunctive Feature Descriptions. Proc. Of The 26th Annual Meeting of the ACL, 1988, pp. 1–9.

Eisele, A. et al. Disjunctive Unification. IWBS Report 124, May 1990, pp. 1–45.

Godden, K. Improving the Efficiency of Graph Unification. Research Publication General Motors Research Laboratories, GMR–6928, Feb. 6, 1990, p. 20.

Kaplan, R.M. et al. Lexical–Functional Grammar: A Formal System for Grammatical Representation. Appeared in: J.W. Bresnan (ed.), The mental representation of grammatical relations. Cambridge: MIT Press, Dec. 1981. p. 100.

Karttunen, L. Features and Values. Proc. of the 10th International Conf. on Computational Linguistics, Stanford University, Stanford, CA. Jul. 1984, pp. 28–33.

Kasper, R.T. A Unification Method for Disjunctive Feature Descriptions. Proc. of the 25th Annual Meeting of the ACL, Stanford, CA. 1987, pp. 235–242.

Knight, K. Unification: A Multidisciplinary Surveys. ACM Computing Survey, vol. 21, No. 1, Mar. 1989, pp. 93–124.

(List continued on next page.)

*Primary Examiner*—Gail O. Hayes
*Assistant Examiner*—Barton L. Bainbridge
*Attorney, Agent, or Firm*—Tracy L. Hurt

[57] ABSTRACT

A method of unifying feature structures using disjunctive lazy copy links. The method begins with unification of two daughter feature structures to generate their mother feature structure. Lazy copy links point from the mother feature structure back to her daughter feature structures. If unification activates any of these lazy copy links, then a selected one of the two daughter feature structures is expanded. Expansion of a disjunctive feature structure may generate a number of alternative feature structures. If so, the alternative feature structures are examined to determine if their number can be reduced by replacing multiple feature structures with one feature structure having multiple disjunctive lazy copy links, each disjunctive lazy copy link pointing to an alternative value. Two or more feature structures can be merged together if they have the same attributes and attribute values. Unification of the two daughter feature structures then resumes, an attribute at a. Whenever the unification of an attribute activates a lazy copy link, expansion is again triggered. The process of expanding, merging, and unifying is repeated until a mother feature structure is generated that includes no activated lazy copy links.

3 Claims, 15 Drawing Sheets

OTHER PUBLICATIONS

Maxwell III, J.T. et al. A Method for Disjunctive Constraint Satisfaction. Proc. of the International Workshop on Parsing Technologies, Pittsburgh, PA, 1989, pp. 18–27.

Maxwell III, J.T. et al. The Interface Between Phrasal and Functional Constraints. Association for Computational Linguistics, 1994, pp. 571–589.

Nakano, M. Constraint Projection: An Efficient Treatment of Disjunctive Feature Descriptions. Proc., 29th Annual Meeting of the ACL, 1991, pp. 307–314.

Wroblewski, D.A. Nondestructive Graph Unification. Proc. of the Conf. on the American Association for Artificial Intelligence, 1987, pp. 582–587.

METHOD OF PARSING UNIFICATION BASED GRAMMARS USING DISJUNCTIVE LAZY COPY LINKS

FIELD OF THE INVENTION

The present invention relates to a method of parsing language strings. In particular, the present invention relates to a method of parsing language strings using unification based grammars and feature structures with disjunctive lazy copy links.

BACKGROUND OF THE INVENTION

The explosion of information has created an unfulfilled demand for automated processing of natural language texts. Such an ability would enable natural language interfaces to databases, automated generation of extracts and summaries of natural language texts, and automated translation and interpretation of natural language. Development of these technologies is hindered by the time required to process modern grammatical formalisms. Many modern grammatical formalisms use recursive feature structures to describe the syntactic structure of natural language utterances. For instance, Lexical-Functional Grammar see Kaplan, Ronald M., and Bresnan, Joan, "Lexical-Functional Grammer. A formal system for grammatical representation." In *The Mental Representation of Grammatical Relations*, pages 173–281. MIT Press, Cambrige, Mass. (Joan Bresnan editor) (1982).) Functional Unification Grammar (see Kay, Martin, "Functional Grammer." In C. Chiarello et al., editors, *Proceedings of the 5th Annual Meeting of the Berkeley Linguistic Society*, Berkeley Calif., pages 142–158 (1979).), HPSG (see Pollard, Carl, and Sag, Ivan, Information-Based Syntax and Semantics, volume 13 of *CSLI Lecture Notes* CSLI, Stanford (1987).) and Definite Clause Grammars (see Pereira, Fernando C. N., and Warren, David H. D., "Definite clause grammers for language analysis—a survey of the formalism and a comparison with augmented transition networks." *Artificial Intelligence*, 13(3):231–278 (1980).) all use recursive feature structures as a major component of grammatical descriptions. Feature structures have the advantage of being easy to understand and easy to implement, given unification-based programming languages such as Prolog. However, they have the disadvantage of making the resulting grammatical formalisms difficult to parse efficiently, both in theory and in practice. In theory, grammatical formalisms that use arbitrary recursive feature structures can be undecidable in the worst case (see Blackburn, Patrick, and Spaan, Edith, "Decidability and Undecidability in stand-alone Feature Logics." In *Proceedings of the Sixth Conference of the EACL*, Utrecht, The Netherlands, pages 30–36 (1993).). Even with suitable restrictions, such as the off-line parsability constraint of LFG, the formalisms can be exponential in the worst case (see Barton, G. Edwards; Berwick, Robert C; and Ristad, Eric Sven, *Computational Complexity and Natural Language*. MIT Press, Cambridge, Mass. (1997).). Although in practice the sorts of phenomena that make a formalism take exponential time are rare, untuned unification-based parsers commonly take minutes to parse a moderately complex sentence.

There have been a number of different approaches over the years to making unification-based parsers run faster. One approach has been to focus on making unification itself faster. In addition to the general work on efficient unification (see Knight, Kevin, "Unification: A multidisplinary survey." *ACM Computing Surveys*, 21(1):93–124 (1989).), there has been work within the computational linguistics community on undoable unification (see Karttunen, Lauri, "D-PATR: A developement enviroment for unification-based grammers." In *Proceedings, 11th International Conference on Computatinal Linguistics* (COLING 86), Bonn, Germany, pages 74–80 (1986).), lazy copying (see Godden, K., "Lazy unification." In *Proceedings of the 28th Annual Meeting of the ACL*, pages 180–187 (1990).), and combinations thereof (see Tomabechi, Hideto, "Quasi-destructive graph unification." In *Second International Workshop on Parsing Technology*, pages 164–171 (1991).). Another approach has been to focus on the problem of disjunction, and to propose techniques that handle special cases of disjunction efficiently. For instance, disjuncts that are inconsistent with the non-disjunctive part can be eliminated early (see Kasper, R. T., "A Unification Method for Disjunctive Feature Description." In *Proceedings of the 25th Annual Meetings of the ACL*, Standford, Calif., pages 235–242 (1987).). Also, certain types of disjunctions can be efficiently processed by being embedded within the feature structure (see Karttunen, Lauri, "Features and Values." In *Proceedings of COING 1984*, Stanford, Calif. (1984); see Bear, John, and Hobbs, Jerry R., "Localizing expression of ambiguity." In *Second Conference on Applied Natural Language Processing*, pages 235–241 (1988); see Maxwell, John T. III, and Kaplan, Ronald M., "An overview of disjunctive constraint satisfaction" In *Proceedings of the International Workshop on Parsing Technologies*, pages 18–27 (1989). (Also published as "A method for disjunctive constraint satisfaction" in M. Tomita, editor, *Current Issues in Parsing Technology*, Kluwer Academic Publishers, 1991).; see Dörre, Jochen, and Eisele, Andreas, "Feature logic with disjunctive unification." In *Proceedings, 13th International Conference on Computational Linguistics* (COLING 90), Helsinki, Finland, pages 100–105 (1990).). There has also been some work on the context-free component of grammatical formalisms. It has been shown that the granularity of phrase structure rules has an important effect on parsing efficiency (see Nakano, M., "Constraint Projection: an Efficient Treatment of Disjunctive Feature Descriptions." In *Proceedings, 29th Annual Meeting of the ACL*, pages 307–314 (1991).). Also, the strategies used for handling the interaction between the phrasal and functional components can make a surprising difference (see Maxwell, John T. III, and Kaplan, Ronald M., "The interface between phrasal and functional constraints." *Computational Linguistics*, 19(3) (1993).).

SUMMARY OF THE INVENTION

An object of the present invention is to reduce the time required to parse a unification based grammar incorporating feature structures.

Another object of the present invention is to take advantage of context-freeness in language strings to reduce parsing time.

A method of unifying feature structures using disjunctive lazy copy links will be described. The method begins with unification of two daughter feature structures to generate their mother feature structure. Lazy copy links point from the mother feature structure back to her daughter feature structures. If unification activates any of these lazy copy links, then one of the feature structures pointed to by an activated lazy copy link is expanded. Expansion of a disjunctive feature structure may generate a number of alternative feature structures. If so, the alternative feature structures are examined to determine if their number can be reduced by replacing multiple feature structures with one feature structure having multiple disjunctive lazy copy links.

each disjunctive lazy copy link pointing to an alternative value. Two or more feature structures can be merged together if they have the same attributes and attribute values. Merging complete, unification of the two daughter feature structures resumes, an attribute at a time, at the point the unification halted for expansion. Whenever the unification of an attribute activates a lazy copy link, expansion is again triggered. The process of expanding, merging, and unifying is repeated until a mother feature structure is generated that includes no activated lazy copy links.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

I. Definitions

Figure 1:
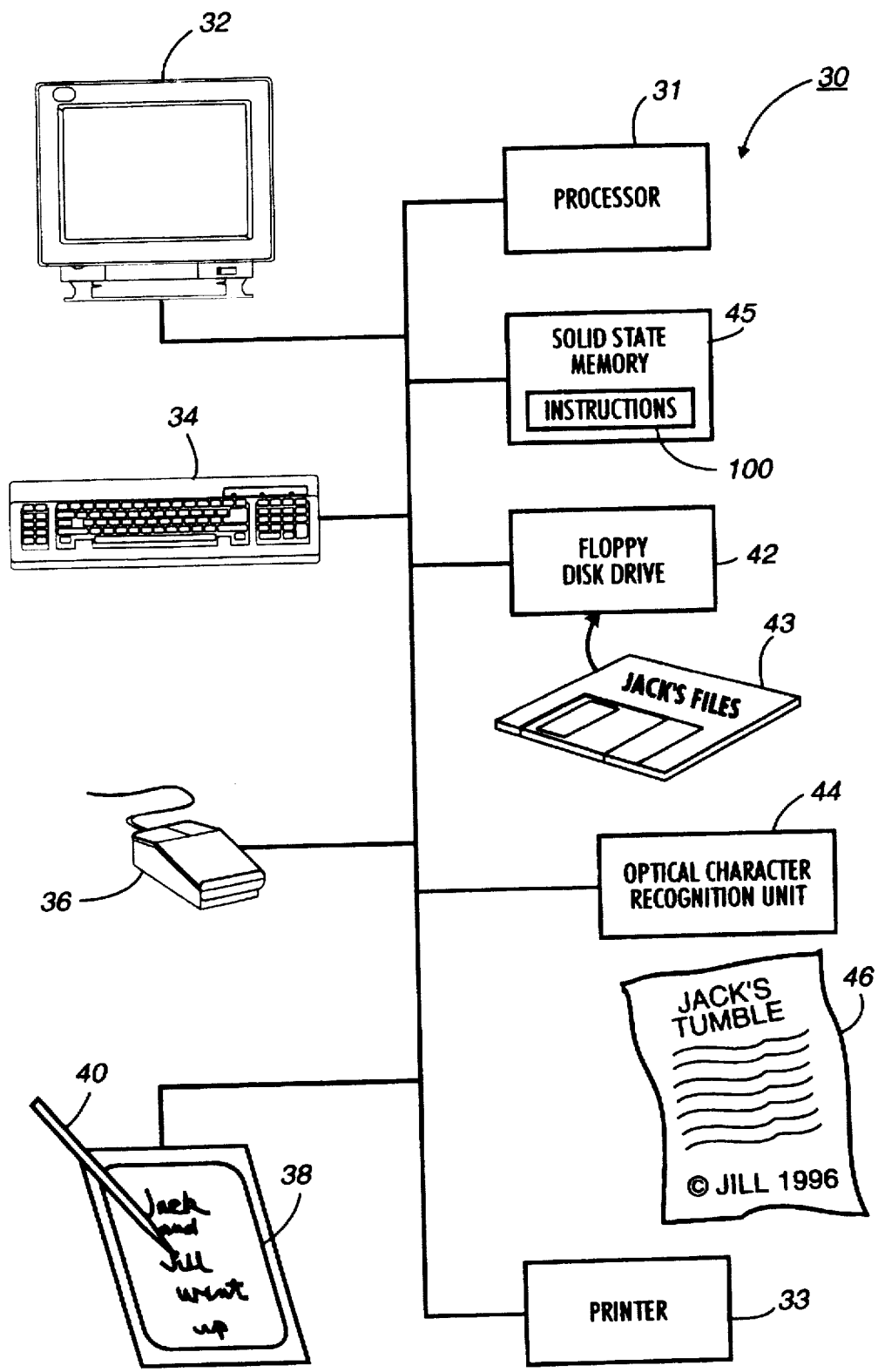
FIG. 1 illustrates a computer system for parsing unification based grammars using disjunctive lazy copy links.

Activated Lazy Copy Link—A lazy copy link is activated during unification when it interacts with some element of another feature structure. (See the definition of feature structure below.) A lazy copy link may be activated by another lazy copy link or a feature, for example. A lazy copy link embedded in a feature structure by truncation is not activated unless the feature structure it is part of is unified with a feature structure that is not empty. For example: Unification of [lazy-link1] with [A+] activates lazy-link1.

Unification of [lazy-link1] with [lazy-link2] activates both lazy-link1 and lazy-link2.

$$\text{Unification of} \begin{vmatrix} A+ \\ B[\text{lazy} - \text{link1}] \end{vmatrix} \text{with } [A+]$$

does not activate lazy-link1.

$$\text{Unification of} \begin{vmatrix} A+ \\ B[\text{lazy} - \text{link1}] \end{vmatrix} \text{with } [B+]$$

activates lazy-link1.

Attribute—An attribute is the name of a grammatical function such as subject, object, number, etc. Each attribute takes a value. Attributes are also called features.

Chart—A chart is a data structure for caching the constituents that have already been constructed by a parser.

Constituent—A group of words within a string, which may or may not be contiguous within the string. According to this definition, a string may include constituents regardless of whether the grammar being used defines constituents explicitly or implicitly. Used synonymously with "edge."

Context Free—A grammar is context free when two constituents can be combined with each other without regard to the internal structure of the constituents being combined.

Cross-product—Process of considering all pairs of elements from two sets.

Disjunction—A complex constraint in logic that is true when any of its disjuncts are true.

Expanding—Expanding is the act of increasing the level of specification of a feature structure so that the resulting feature structure includes information previously omitted by truncation and indicated via a lazy copy link. Expansion might not remove all lazy copy links from a feature structure because lower levels are represented via lazy copy links.

Feature Structure—A representation of a surface grammatical function of a part of a string. This information is represented as a set of ordered pairs, each of which consists of an attribute and a specification of that attribute's value. Feature structures are described notationally by arranging the set of ordered pairs vertically inside square brackets with each attribute value pair placed on a single horizontal line.

Interact—A lazy copy link is said to interact, or to be activated, when it is unified with another lazy copy link or feature.

Lazy Copying—A standard technique for unifying feature graphs together that only copies those parts of feature graphs that interact.

Non-finite Feature Structure—A feature structure that has feature structures as the values of its features.

NP—Noun Phrase.

O( )—Notation meaning "on the order of." For example, "O(n)" means on the order of n.

Parsing—A process of analyzing a sentence or string to determine its underlying meaning.

PP—Prepositional Phrase.

Truncated—A truncated feature structure is one that is not fully specified; i.e., a truncated feature structure is a partial copy of alternative feature structures.

Underspecified—A feature structure is said to be underspecified when it does not include all information necessary to describe its features, instead using lazy copy links to other feature structures to indicate the information omitted.

Unification—Unification is a combining operation on two feature structures that produces a third feature structure. In general the conjunctive feature structure represents more information than either of the feature structures it unifies.

Unspecified—A feature structure is said to be unspecified when it includes only a lazy copy link to another feature structure or lazy copy links to one or more other feature structures.

II. Overview

FIG. 1 illustrates computer system 30, which incorporates the method of unification of the present invention. Using instructions 100 stored in memory 45 computer system 30 is able to parse in cubic time those portions of a string represented by a unification based grammar that are context-free. Briefly described, instructions 100 cause computer system 30 to unify the disjunctive feature structures associated with two sister constituents. If a lazy copy link is activated by that unification, then computer system 30 expands the level of specification of one of the sister feature structure(s) pointed to by an activated lazy copy link(s). Expanding a disjunctive feature structure may generate a number of alternative feature structures. If so, these alternative feature structures are examined by computer system 30 to determine if their number can be reduced by replacing multiple feature structures with one feature structure having multiple disjunctive lazy copy links, each pointing to an alternative value. If multiple feature structures have the same attributes and values, computer system 30 merges them together to produce a single disjunctive feature structure with embedded disjunctive lazy copy links. Two attributes are treated as having the same value if those value are indicated by lazy copy links, thus preventing copying up of unnecessary information. Computer system 30 then resumes unification of the two sister feature structures, an attribute at a time. Whenever the unification of an attribute activates a lazy copy link(s), computer system 30 again expands one of the daughter feature structures pointed to by an activated lazy copy link, merging the alternative feature structures so produced, whenever possible. This process of unification and expansion continues until a mother feature structure is generated that includes no activated lazy copy links. Because feature structures are expanded only when truncated information becomes relevant, computer system 30 takes advantage of context-freeness, whenever it occurs, to prevent the repeated copying of information not relevant to the process of unification.

A. Computer System for Unification-Based Parsing

Prior to a more detailed discussion of the present invention, consider computer system 30. Computer system 30 includes monitor 32 for visually displaying information to a computer user. Computer system 30 also outputs information to the computer user via printer 33. Computer system 30 provides the computer user multiple avenues to input data. Keyboard 34 allows the computer user to input data manually. The computer user may also input information by writing on electronic tablet 38 with pen 40. Alternately, the computer user can input data stored on machine readable media, such as a floppy disk 43, by inserting machine readable media into disk drive 42. Optical character recognition unit (OCR unit) 44 permits users to input hard copy natural language document 46, which it converts into a coded electronic representation, typically American National Standard Code for Information Interchange (ASCII).

Processor 31 controls and coordinates the operation of computer system 30 to execute the commands of the computer user. Processor 31 determines and takes the appropriate action in response to each command by executing instructions stored electronically in memory, either memory 45 or on floppy disk 43 within disk drive 42. Typically, operating instructions for processor 31 are stored in solid state memory 45, allowing frequent and rapid access to the instructions. Memory devices that can be used to realized memory 45 include standard semiconductor logic devices such as read only memories (ROM), random access memories (RAM), dynamic random access memories (DRAM), programmable read only memories (PROM), erasable programmable read only memories (EPROM), and electrically erasable programmable read only memories (EEPROM), such as flash memories.

III. The Problem with Standard Parsing Approaches

The parsing method of the present invention takes advantage of the observation that standard approaches to parsing unification based grammars take exponential time even when the linguistic phenomena being modeled are context-free in power. That is to say, even when linguistic phenomena can be represented using simple phrase structure rules, such that a phrase structure parser will take at most $O(n^3)$ time to parse a sentence, where n is the length of the sentence in words, a standard unification based feature structure parser modeling the same sentence will take $O(2^n)$ time. Understanding why adding feature structures so dramatically increases parsing time requires an understanding of how a context-free grammar can be parsed in cubic time using a chart, and how adding feature structures makes the resulting system exponential when using the standard approaches to parsing. Both topics are discussed in detail below.

A. Parsing Using a Chart

A chart is simply a data structure for caching the constituents that have already been constructed by a parser. The main advantage of having a chart is that the parser can reuse existing constituents as it tries to parse the sentence in different ways (see Sheil, Beau. "Observations on context-free parsing." In *Statistical Methods in Linguistics*, 1976:71–109 (1976).). If the grammar is context-free, then the parser doesn't need to know how constituents get constructed, only that they are constructable. For instance, the parser will need to know whether there is an NP that goes from the fifth word to the tenth word, but it doesn't need to know whether the NP has a PP in it. Because of this, there are only $O(Cn^2)$ different constituents that might be constructed for a sentence of length n, where C is the number of different categories that the grammar allows. The $n^2$ comes from the cross-product of all possible word positions. Conceptually, the chart is just a three-dimensional array of (Category, Left Position, Right Position) that indicates whether or not there is a constituent of type Category that starts at the Left Position and ends at the Right Position. A sentence has a parse if there is an S category that begins at the beginning of the sentence and ends at the end of the sentence. One way to fill in the chart is to start with all one word constituents, then build all of the two word constituents, then the three word constituents, and so on with each level building on the results of the previous levels. This is called the CKY algorithm (see Younger, D. H., "Recognition and parsing of context-free languages in time $n^3$" *Information and Control*, 10:189–208 (1967).). The reason that the algorithm is $O(n^3)$ rather than $O(n^2)$ is that each constituent can be built in multiple ways. In the worst case, a constituent that is O(n) in size can be built in O(n) different ways. To build O($n^2$) constituents in O(n) ways each requires O($n^3$) time. The CKY algorithm requires that constituents be built in a particular order, from smaller to larger. A more flexible way of building a chart is to keep an agenda of constituents that haven't been processed (see Earley, J., "An efficient context-free algorithm." *Communications of the ACM*, 13:94–102 (1970).). The constituents are taken off of the agenda one at a time, and processed as follows. Each constituent looks to its left and its right for constituents that it can combine with. When it finds a constituent to combine with, it checks the chart to see if the resulting constituent is already in the chart. If it isn't, then the constituent is added to the chart and placed on the agenda. The process then continues until the agenda is empty. The agenda makes things more flexible because constituents can be taken off of the agenda in any order. This sort of parser is called an "active chart parser."

As described, the above algorithms only determine whether or not a sentence is parsable; they do not determine what the valid parse trees are. However, this information can be obtained by simple additions to these algorithms. Whenever a constituent, referred to as the "mother" constituent, is constructed out of sub-constituents, or "daughter" constituents, the construction is recorded as a local subtree on the constituent that was constructed. A chart annotated with such subtrees is called a "parse forest." When the parser is done, a particular parse tree can be read out by starting at the S constituent that spans the whole sentence, and picking one subtree at random. Then for each daughter constituent, one subtree is picked at random. This process is carried on until the tree is fully specified. In general, there can be exponentially many such fully-specified trees, but the parse forest for them can be produced in cubic time because they are stored in a compact representation.

B. The Effect on Parsing of Adding Feature Structures

Many grammar formalisms add feature structures to a backbone of context-free phrase structure rules. Depending upon the grammar, feature structures may be explicit, as is the case Lexical-Functional Grammar (see Kaplan, Ronald M., and Bresnan, Joan, "Lexical-Functional Grammar; A formal system for grammatical representation." In *The Mental Representation of Grammatical Relations*, pages 173–281. MIT Press, Cambridge, Mass. (Joan Bresnan editor) (1982).), or implicit as the case with Functional Unification Grammar (see Kay, Martin, "Functional Grammar." In C. Chiarello et al., editors, *Proceedings of the 5th Annual Meeting of the Berkeley Linguistic Society*, Berkeley, Calif., pages 142–158 (1979).).

A standard approach to parsing feature structures, regardless of whether they are explicit or implicit, is to first build a context-free phrase structure chart, and then to make a second pass on the chart data structure, building feature structures bottom-up (see Maxwell, John T. III, and Kaplan, Ronald M., "The interface between phrasal and functional constraints." *Computational Linguistics*, 19(3) (1993).). First, feature structures are instantiated from lexical items according to the feature constraints given. If the lexical items are ambiguous in any way, this will produce multiple feature structures. Then, feature structures for a mother constituent are constructed by taking the cross-product of the feature structures that belong to the daughter constituents. Afterward any inconsistent combinations are filtered out. The result is a set of feature structures that are consistent to this point. If there is more than one way of constructing the mother constituent out of daughter constituents, then the sets of feature structures produced from all of the analyses are unioned together. This process continues bottom-up until feature structures for all of the constituents have been constructed.

This process is exponential in the worst case because of the cross-product that occurs at each level. For instance, if each lexical item is two ways ambiguous, then even if the phrase structure grammar is unambiguous there can be O($2^n$) different feature structures for the top constituent.

If only finite-valued features are used, then a parser can be made to run in cubic time. This is because only a finite number of feature structures is possible, and at each level we have to keep track only of which of these is possible without enumerating all of the ways that we got them. Once the upper bound on the number of possible feature structures is reached then the number of feature structures at each level stops growing. If the all of the feature values are binary, then the top level constituent can have at most O($2^k$) different feature structures, where k is the number of different features. Thus, an exponential in sentence length turns into an exponential grammar constant by using only finite feature graphs. Unfortunately, the time required to parse non-finite feature structures cannot be reduced in the same manner.

IV. Parsing Method of the Present Invention

A. Disjunctive Lazy Copy Links and Feature Structures

The present method of parsing unification-based grammars reduces the time required to parse context-free strings by introducing disjunctive lazy copy links. This new type of lazy copy link allows feature structures to be treated as if they were truncated, but, when necessary, to be expanded when the truncated information becomes relevant.

Familiarity with standard lazy copy links will aid the coming discussion of disjunctive lazy copy links. Standard lazy copy links are the typical way of reducing the amount of copying required by a unification-based chart parser (see Godden, K., "Lazy unification." In *Proceedings of the 28th Annual Meeting of the ACL*, pages 180–187 (1990).). Whenever feature structures from daughter constituents get unified together, the feature structures must be copied to prevent cross-talk. This is because the daughter feature structures may be used in other analyses of the sentence. However, copying feature structures is very expensive. Thus, in 1990 Godden proposed lazy copying of feature structures. With lazy copying at first just the top levels of each feature structure are copied. At the fringe of what has been copied, standard lazy copy links point back to the material that hasn't been copied yet. Then the copied feature structures are unified together. If no standard lazy copy links are encountered during the unification, then the features were disjoint and the unification can stop. The resulting feature structure will probably have a mixture of lazy copy links, some pointing to one daughter and some pointing to another.

Figure 2:
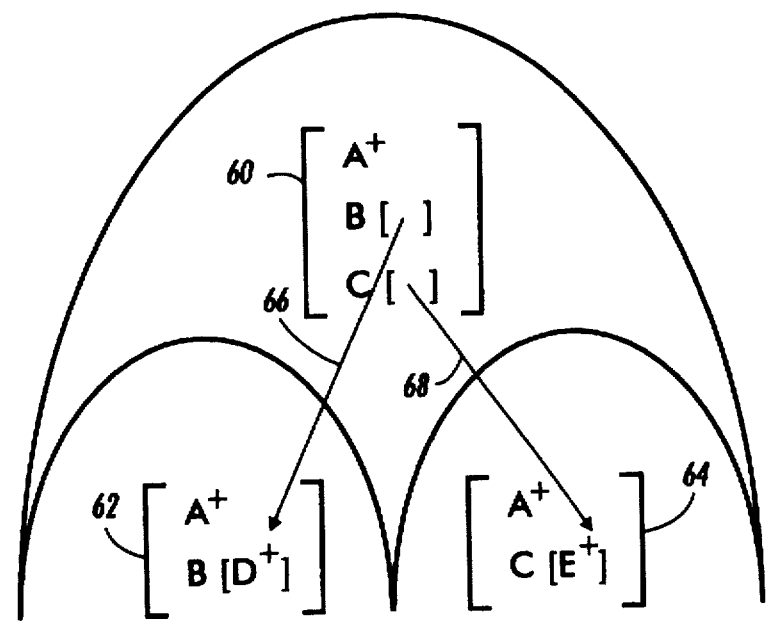
FIG. 2 illustrates a chart for a natural language string in a unification based grammar.

FIG. 2 illustrates graphically a situation like that just described. Feature structure 60 results from the unification of daughter feature structures 62 and 64. Feature structure 60 is not fully specified, representing the values of two of its attributes via standard lazy copy links 66 and 68. Lazy copy link 66 points to information within daughter feature structure 62, while lazy copy link 68 points to information contained by daughter feature structure 64.

Lazy copy links must be expanded when they are encountered during unification because of the possibility that the material that wasn't copied is not unifiable with the corresponding material in a sister constituent. Lazy copy links are expanded by copying up one level of features in the feature structure below, with a new set of lazy copy links pointing to the material yet to be copied. The unification is continued, with the possibility that more lazy copy links will need to be expanded.

The major difference between disjunctive lazy copy links and standard lazy copy links is that each disjunctive lazy copy link represents an alternative extension of a feature value. Like standard lazy copy links, when encountered during unification disjunctive lazy copy links trigger expansion of their associated lazily copied feature structures. Unlike standard lazy copy links, two or more disjunctive lazy copy links may be joined to the same attribute without triggering expansion. The expanded feature structures may also include lazy copy links.

As a result of using disjunctive lazy copy links each constituent, or edge, of a chart includes two types of feature structures: conjunctive and disjunctive. Conjunctive feature structures result from unifying together daughter feature structures. Conjunctive feature structures use lazy copy links in the standard way to avoid copying up material from below. In contrast, disjunctive feature structures result from the merging together of conjunctive feature structures that are the same up to a point. Disjunctive feature structures use disjunctive lazy copy links to represent alternative extensions of a truncated feature structure. Because disjunctive feature structures are expoded to a constituent's consumer, they are also called "external" while conjunctive feature structures, which typically are not exported, are referred to as "internal."

Figure 3:
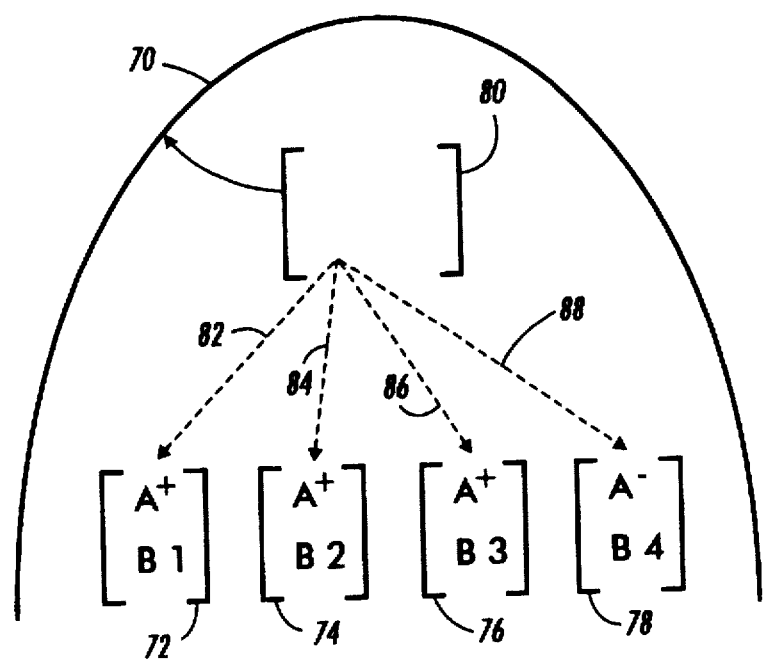
FIG. 3 illustrates a chart for a natural language string using a unification based grammar and disjunctive lazy copy links.

FIG. 3 illustrates the conjunctive and disjunctive feature structures associated with constituent 70. Feature structures 72, 74, 76, and 78 are conjunctive. Disjunctive feature structure 80 is truncated and empty. Each of the alternatives represented by disjunctive feature structure 80 are indicated by a disjunctive copy link 82, 84, 86, or 88. Dashed lines distinguish disjunctive copy links 82, 84, 86, and 88 from the conjunctive copy links of FIG. 2, which are represented by solid lines. Computationally, the two types of links can be distinguished based upon their links to their associated edge.

The conjunctive and disjunctive feature structures of a chart form an and-or tree of feature structures: the conjunctive feature structures point to the disjunctive daughter feature structures that they unify, and the disjunctive feature structures point to the alternative conjunctive feature structures that they are a partial, or truncated, copy of. This and-or structure mirrors the and-or structure of the chart, where constituents can have alternative subtree analyses and subtrees are the conjunction of constituents.

Throughout the remaining discussion, edges, lazy copy links, and feature structures will be represented graphically, as in FIGS. 2 and 3. However, computationally these entities are represented as data structures. Each edge data structure includes a listing of:

1. Pointers to disjunctive feature structures associated with that edge;
2. Pointers to subtrees, which point to daughter edges; and
3. Pointers to mother edges.

Each disjunctive feature structure data structure includes a listing of:

1. A pointer to the edge with which the disjunctive feature structure is associated;
2. Pointers to conjunctive feature structures that the disjunctive feature structure represents a truncated version of; and 3. Contents of the disjunctive feature structure, including any lazy copy links embedded in the disjunctive feature structure.

Each conjunctive feature structure data structure includes a listing of:

1. A pointer to the edge with which the conjunctive feature structure is associated; and
2. Attributes and specification of the values of the conjunctive feature structure to the extent possible, attribute values are underspecified, including any lazy copy links embedded in the conjunctive feature structure;
3. A pointer to the subtree responsible for its combination.

Preferably, each feature structure is either "on the chart" or "on the agenda." That is to say, if an edge includes a pointer to a particular feature structure then that feature structure will not be on the agenda, and conversely, if a feature structure is included in the agenda no edge data structure will include a pointer to that feature structure. Despite this preference, to better illustrate the operation of the method of the present invention the graphical representations of charts in the following figures may include feature structures that are actually on the agenda.

B. Method of Lazy DNF Unification

Briefly described, lazy DNF unification involves using disjunctive lazy copy links to treat feature structures as if they were truncated. If a lazy copy link is activated by the unification of two sister constituents, then computer system 30 expands the level of specification of one of the sister feature structures pointed to by an activated lazy copy link. By expanding a disjunctive feature structure computer system 30 may generate a number of alternative feature structures. If so, computer system 30 examines the alternative feature structures to determine if their number can be reduced by replacing multiple feature structures with one feature structure having multiple disjunctive lazy copy links, each pointing to an alternative value. If multiple feature structures have the same attributes and values, computer system 30 merges them together to produce a single disjunctive feature structure with embedded disjunctive lazy copy links. Two attributes are treated as having the same value if those value are indicated by lazy copy links, thus preventing copying up of unnecessary information. Computer system 30 then resumes unification of the two daughter feature structures, an attribute at a time. Whenever the unification of two attributes activates one or more lazy copy links, computer system 30 expands one feature structure pointed to by one of the activated lazy copy links. The process of expanding, merging, and unifying continues until the mother feature structure includes no activated lazy copy links. Thus, feature structures are expanded only when truncated information becomes relevant, there taking advantage of context-freeness whenever it occurs to prevent the repeated copying of information not relevant to the process of unification.

1. Chart Initialization

Figure 4:
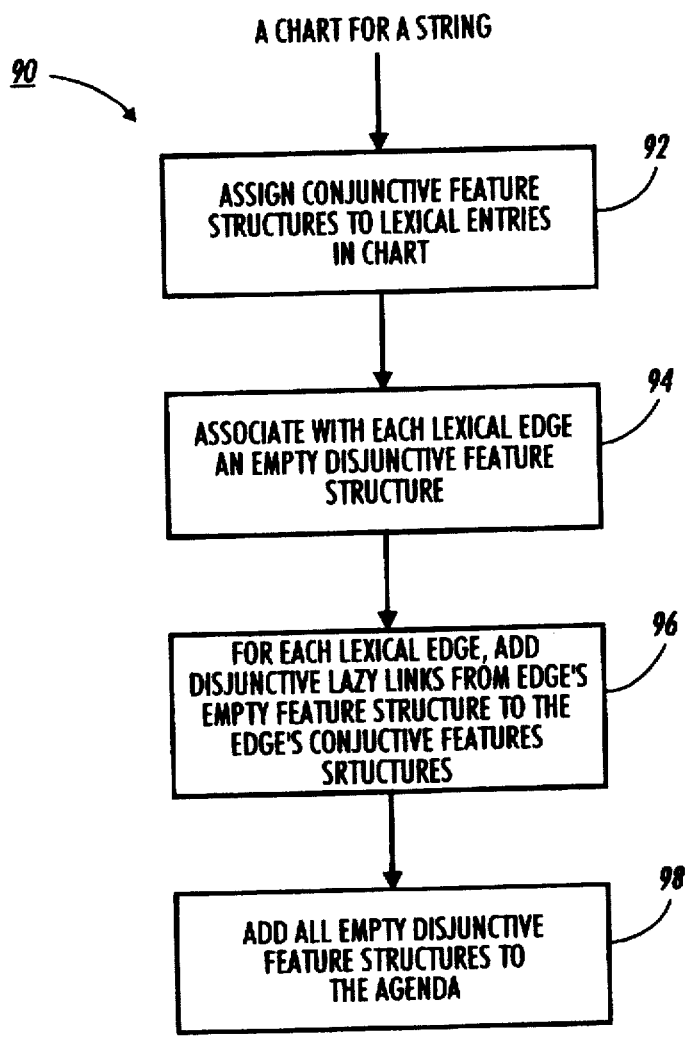
FIG. 4 is a flow diagram of a method of initializing a chart.

Before beginning to unify the feature structures of a chart, the chart must be initialized with empty feature structures. FIG. 4 illustrates in flow diagram form instructions 90 for initializing a chart. Instructions 90 may be stored in machine readable form in solid state memory 45 or on a floppy disk placed within floppy disk drive 42. Instructions 90 may be realized in any computer language, including Prolog, LISP and C++.

Processor 31 begins execution of instructions 90 with step 92. During step 92 processor 31 assigns feature structures to the lexical entries of the chart. These are the conjunctive, internal, feature structures for the lowest edges of the chart. That done, processor 31 advances to step 94. During step 94 processor 31 associates with each lexical edge an empty disjunctive feature structure. The empty feature structure is associated with the edge by a pointer to the edge, but the empty feature structure is not yet added to the chart. Subsequently, during step 96 processor 31 adds disjunctive lazy copy links pointing from the empty feature structure to the alternative conjunctive feature structures. Processor 31 then exits step 96 and advances to step 98. Processor 31 places all the empty feature structures generated during step 94 on an agenda during step 98. Processor 31 is now ready to begin lazy DNF unification of the chart.

2. Unification

Figure 5A:
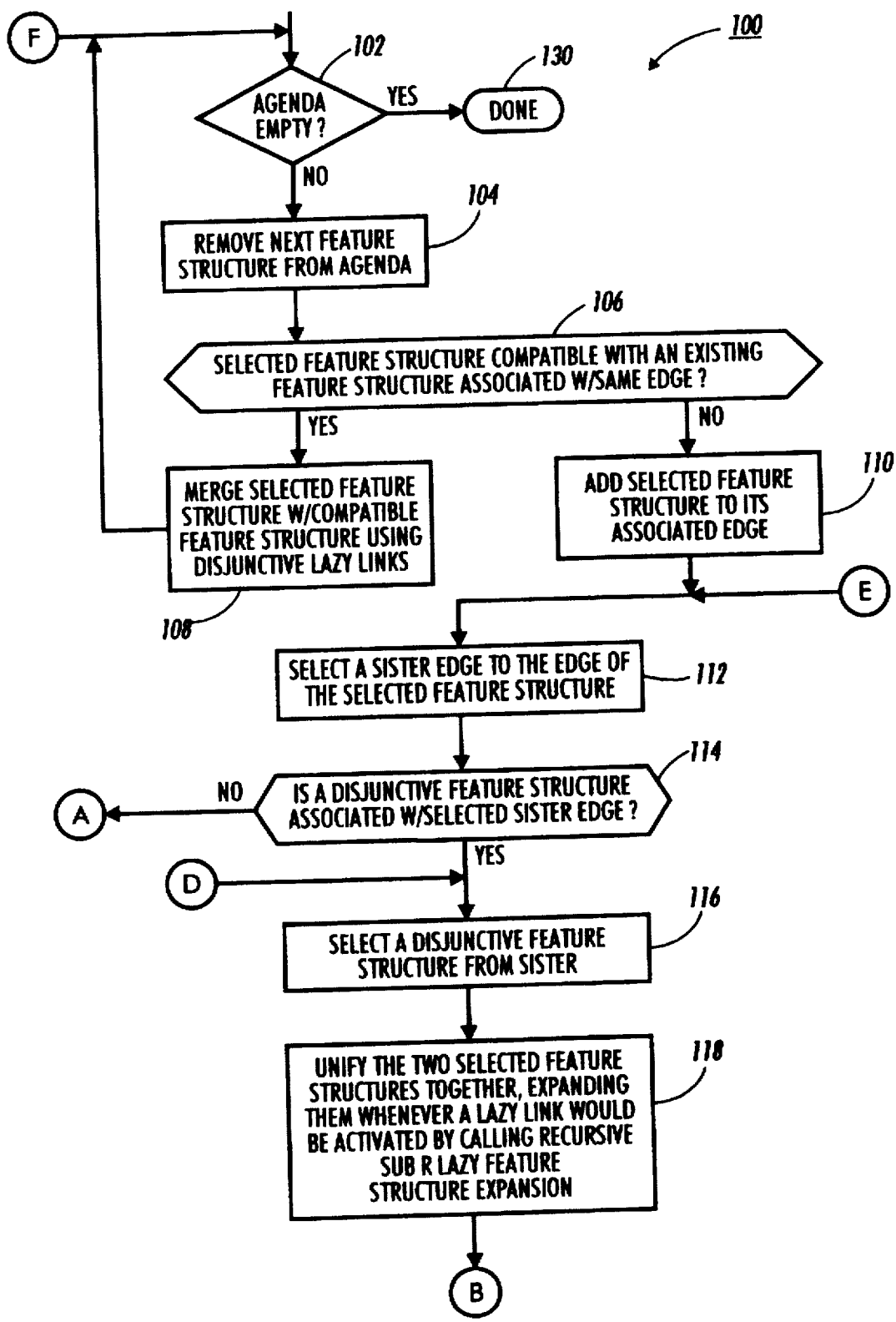
FIG. 5 illustrates a flow diagram for a method of unifying feature structures using disjunctive lazy copy links to take advantage of context-freeness.
Figure 5B:
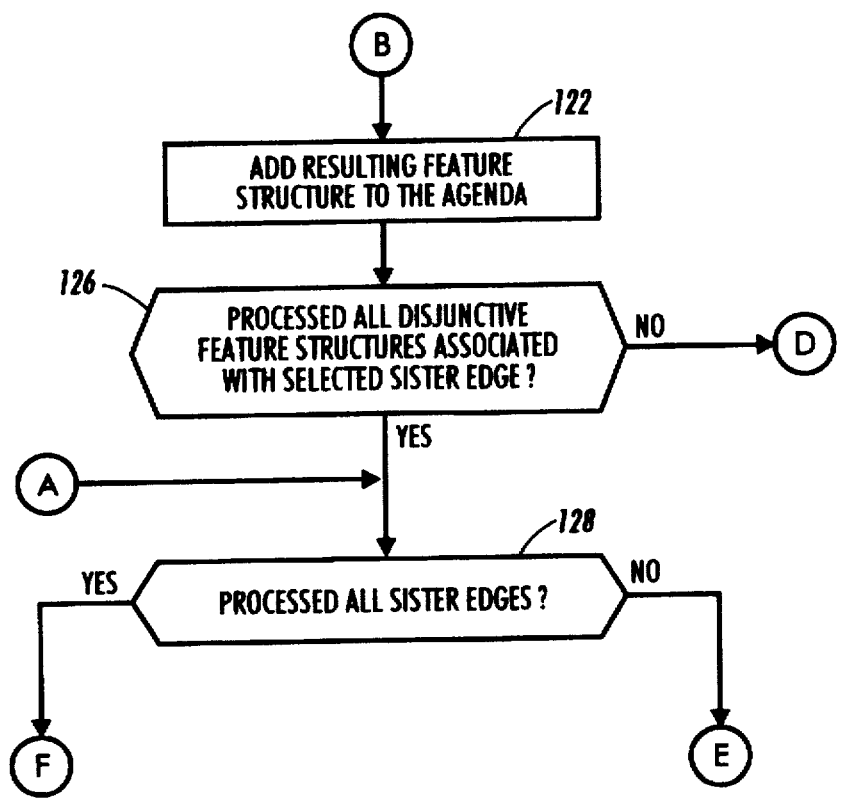

FIG. 5 illustrates in flow diagram form instructions 100 for performing lazy DNF unification. Instructions 100 may be stored in machine readable form in solid state memory 45 or on machine readable media, like floppy disk 43. Briefly described, instructions 100 direct processor 31 to unify a feature structure selected from the agenda with the feature structures of sister edges. Expansion of external feature structures is triggered whenever processor 31 encounters lazy copy links during unification. Processor 31 continues executing instructions 100 until all feature structures have been removed from the agenda. Instructions 100 may be realized in any computer language, including Prolog, LISP and C++.

After a chart has been initialized processor 31 begins executing instructions 100. Processor 31 first determines during step 102 whether there are any unifications to be performed. Processor 31 makes this determination by examining the agenda. If the agenda is empty, no further unifications need be performed. On the other hand, when the agenda is not empty, then there is at least one unification to be performed. In response to this situation, processor 31 exits step 102 and advances to step 104.

Processor 31 removes the next feature structure from the top of the agenda during step 104. Let us call this feature structure "the selected feature structure." Having selected a feature structure, processor 31 exits step 104 and advances to step 106.

During step 106, processor 31 determines whether the edge associated with the selected feature structure includes another feature structure with which the selected feature structure is compatible. If so, the two feature structures are merged together during step 108. On the other hand, if the edge associated with the selected feature structure does not currently have any other feature structures associated with it, processor 31 branches to step 110. At that point, processor 31 adds feature structure to the selected edge. That done, processor 31 advances to step 112.

Figure 6:
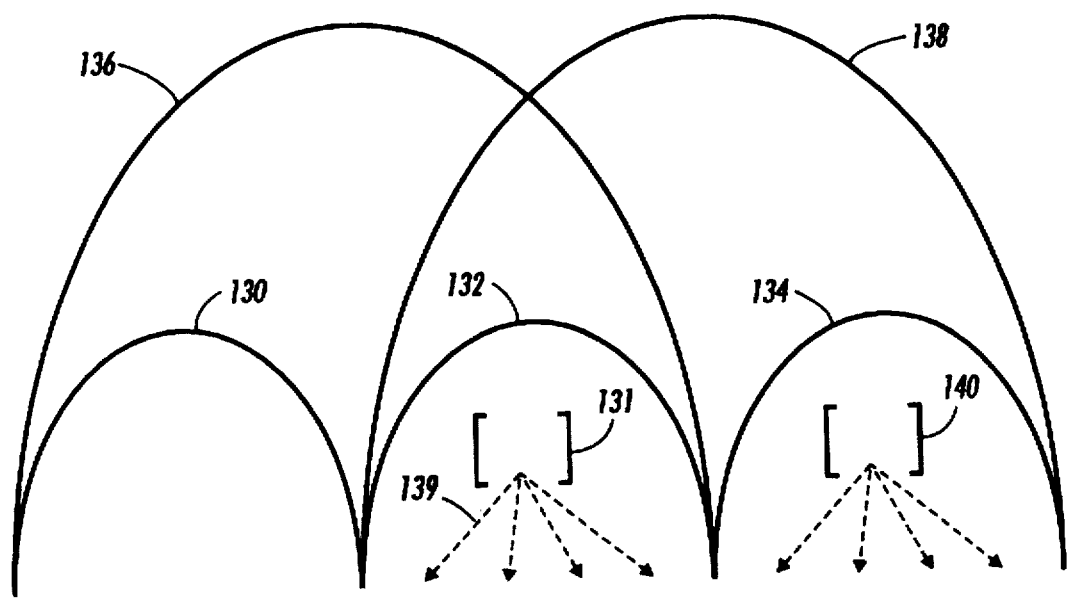
FIG. 6 illustrates an exemplary chart.

With step 112 processor 31 begins efforts to identify feature structures to be unified with the selected feature structure. Processor 31 begins by selecting a sister edge of the selected edge. As used herein two edges are sisters when they are the daughters of the same mother edge. For example, referring to FIG. 6, edge 132 has two sisters, edges 130 and 134. Edge 132 shares a different mother with each of its sister edges. In other words, edge 132 has two mothers, edges 136 and 138. Edges 132 and 130 are daughters of edge 136 while edges 132 and 134 are daughters of edge 138. Having selected a sister edge, processor 31 branches to step 114 from step 112.

Processor 31 searches the selected sister edge for an associated feature structure during step 114. When the selected sister edge has no disjunctive feature structure linked to it yet, then unification with respect to the two edges is postponed. In response, processor 31 exits step 114 and branches to step 128 to see if there's a chance other unifications can be done. On the other hand, when the selected sister edge includes a disjunctive feature structure, processor 31 branches from step 114 to step 116.

During step 116 processor 31 selects one of the disjunctive feature structures associated with the selected sister edge. Afterward, processor 31 advances to step 118.

Processor 31 unifies together the selected feature structure with that of the selected sister during step 118. This is a recursive process that begins by creating an empty mother feature structure, with conjunctive lazy copy links back to both daughters. These lazy copy links interact with each other, halting the unification, and triggering expansion of one of the feature structures pointed to by one of the activated lazy links by activating it. When the daughter feature structure is empty the activated feature structure is the daughter feature structure, but when the daughter feature structure is not empty the activated feature structure may be a sub-part of the daughter feature structure. Processor 31 expands the activated feature structure by calling a recursive subroutine, which will be described in more detail below with respect to FIG. 7. After expanding the activated feature structure, processor 31 resumes the unification of the two feature structures. Processor 31 copies the attributes of the feature structure just expanded up into the mother feature structure, an attribute at a time, with the value of the attribute being indicated by a lazy link back to original attribute's value. Next, the attributes of the other daughter feature structure are copied up into the mother feature structure an attribute and a lazy link at a time, unifying matching attributes. Whenever a lazy copy link is activated by this process, unification halts and a target feature structure of one of the activated lazy links is expanded. This process of unifying, detecting an activated lazy copy link, expanding a target feature structure if necessary, and then resuming unification continues until a version of the mother feature structure is generated that contains no activated lazy copy links. At that point, processor 31 exits step 118 and advances to step 122.

Processor 31 adds the mother feature structure generated during step 118 to the agenda during step 122. Afterward, processor 31 advances to step 126.

During step 126, processor 31 determines whether the selected sister edge includes other feature structures with which the selected feature structure should be unified. If so, processor 31 exits step 126 and returns to step 116 to begin that task. Processor 31 loops through steps 116 through 126 in the manner previously described until the selected feature structure has been unified with all the feature structures currently linked to the selected sister edge. When that occurs, processor 31 branches to step 128 from step 126.

During step 128 processor 31 determines if it has processed all sister edges of the selected feature structure. If not, processor 31 may need to perform other unifications. In response to that situation, processor 31 returns to step 112 to begin that process. On the other hand, once all sister edges have been processed, processor 31 has unified all feature structure that it currently can with the selected feature structure. In this situation, processor 31 responds by branching to step 102 from step 128. If processor 31 discovers that the agenda is not empty during step 102, then it branches through the loop of steps 102 through 128 until all feature structures have been removed from the agenda. When that occurs, processor 31 branches to step 130 from step 102, unification complete.

3. Lazy Feature Structure Expansion

Figure 7A:
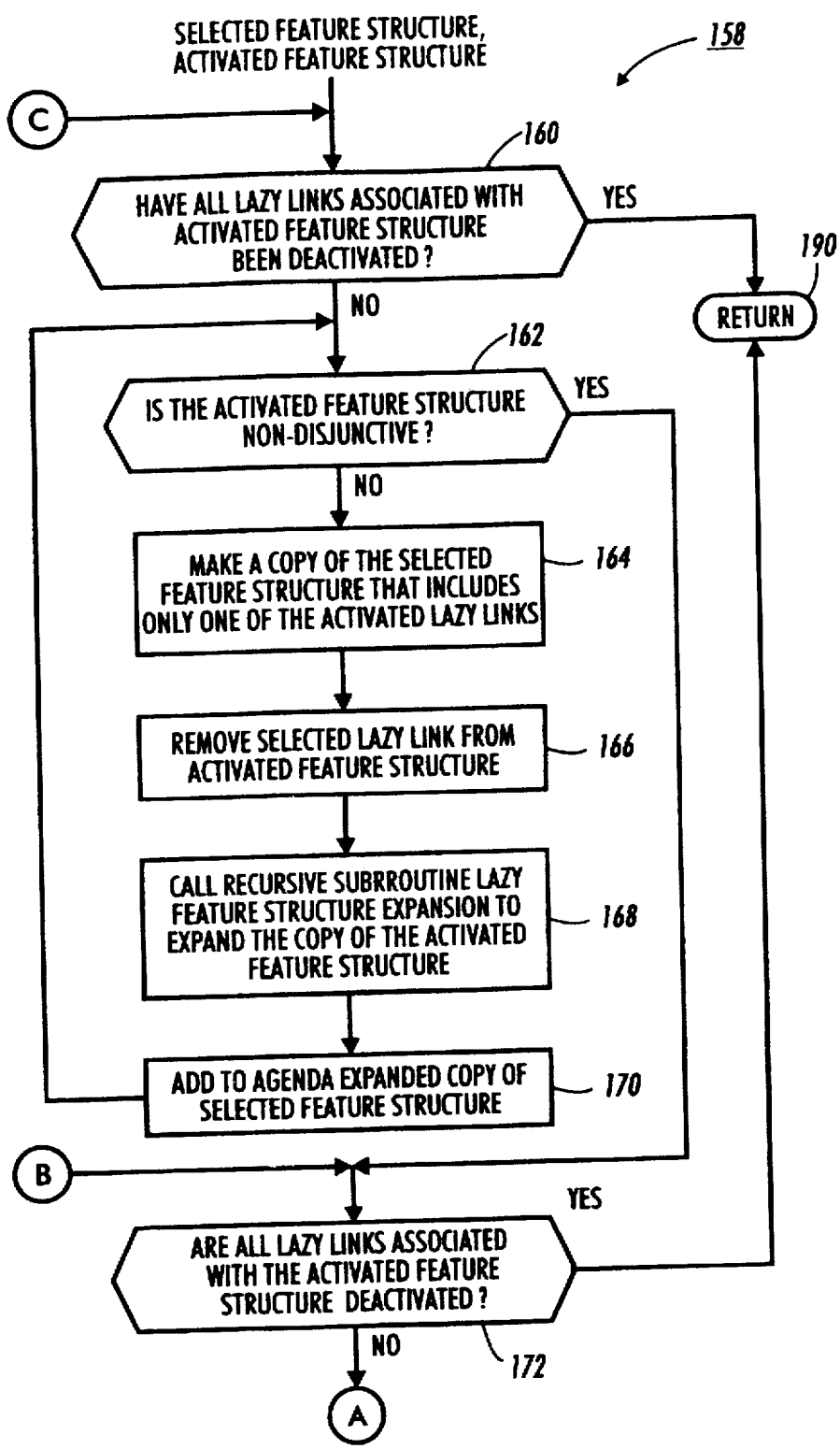
FIG. 7 illustrates a flow diagram of a method of recursively expanding feature structures including conjunctive lazy copy links and disjunctive lazy copy links.
Figure 7B:
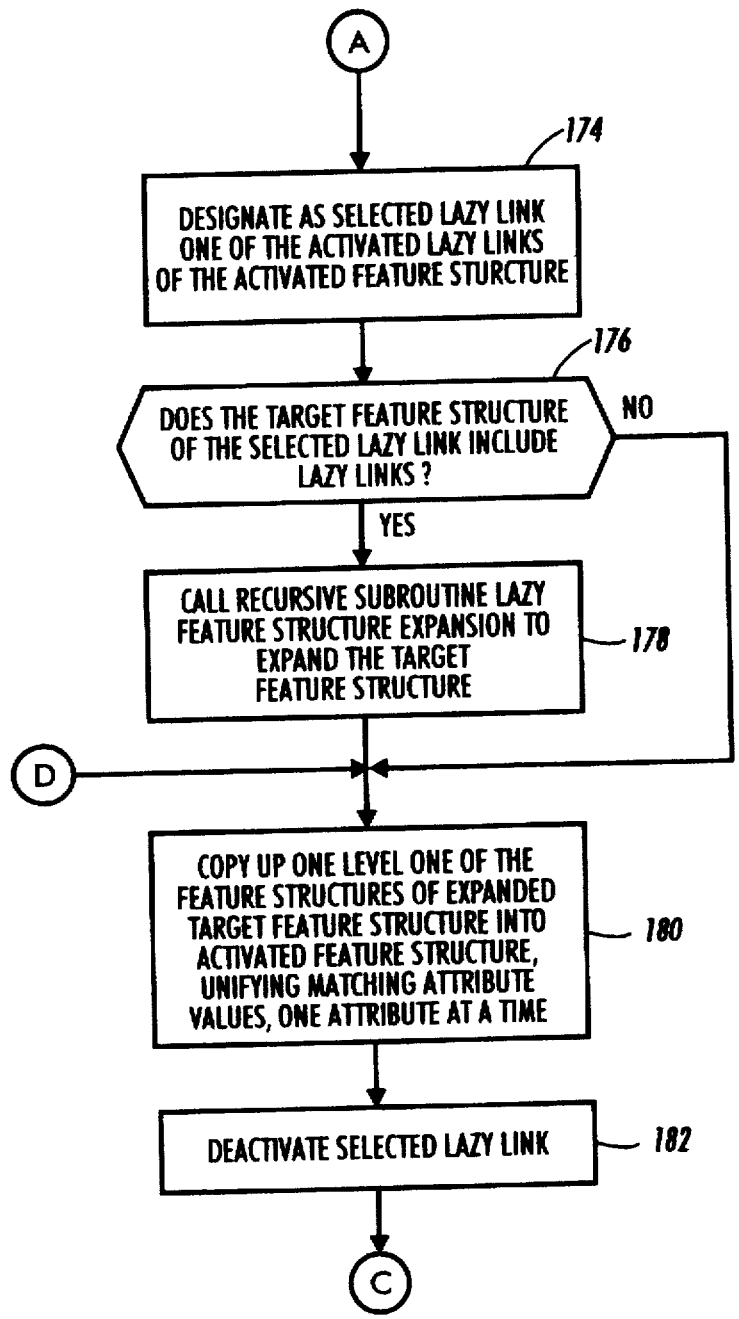

FIG. 7 illustrates in flow diagram form instructions 158 for recursively expanding an activated feature structure of a selected feature structure. Instructions 158 may be stored in machine readable form in solid state memory 45 or on machine readable media, like floppy disk 43. Briefly described, expansion of an activated feature structure with N disjunctive lazy copy links begins by making N−1 copies of the selected feature structure. As used herein, a copy is identical to the selected feature structure but includes only one of the activated lazy copy links of the activated feature structure. As each copy is made, the lazy copy link just copied is removed from the original selected feature structure. Each of the N−1 copies of the selected feature structure is then added to the agenda, insuring that they will later be unified with those of sister edges. Afterward, the sole remaining activated lazy copy link within the selected feature structure is followed to the feature structure to which it points, the target feature structure. If necessary, the target feature structure is expanded, and then copied up into the activated feature structure within the original of the selected feature structure. Matching attribute values are unified where appropriate.

Execution of instructions 158 begins with step 160. Processor 31 determines whether it has completed the expansion of the activated feature structure during step 160 by determining whether all lazy copy links associated with the activated feature structure within the original of the selected feature structure have been deactivated. Until they have been, processor 31 branches from step 160 to step 162.

Processor 31 decides during step 162 whether any copies of the selected activated structure need to be made. Processor 31 makes copies of the selected feature structure if its activated feature structure includes more than one disjunctive lazy copy link. If the activated feature structure is disjunctive, processor 31 branches from step 162 to step 164 to begin the process of making copies. Processor 31 selects one of the activated lazy copy links associated with the activated feature structure within the original selected feature structure and creates a copy of the selected feature structure that includes a copy of the activated feature structure and only the selected lazy copy link of the lazy copy links associated with the activated feature structure. The selected lazy copy link is then removed from the activated feature structure within the original selected feature structure, thereby deactivating the selected lazy copy link during step 166. Processor 31 then advances from step 166 to step 168.

During step 168 processor 31 expands the copy of the selected feature structure just created by recursively calling the lazy feature structure expansion subroutine 158 to expand the copy of the activated feature structure. Because the activated feature structure within the copy of the selected feature structure includes only one lazy copy link, attributes associated with one daughter feature structure will be copied into it. Afterward, processor 31 branches to step 170, and adds to the agenda the expanded copy of the selected feature structure.

Processor 31 repeatedly executes instructions 162, 164, 166, 168, and 170 until the activated feature structure within the original of the selected feature structure includes only one disjunctive lazy copy link, or only conjunctive lazy copy links. When that occurs, processor 31 branches from step 162 to step 172. During step 172 processor 31 determines whether all the lazy copy links associated with the activated feature structure within the original of the selected feature structure have been deactivated. If not, processor 31 branches from step 172 to step 174.

With step 174 processor 31 begins efforts to expand the activated feature structure within the original of the selected feature structure by adding to it relevant information from the feature structures pointed to by the remaining lazy copy links. Let us call these feature structures "target feature links." First, during step 174 processor 31 designates one of the remaining activated lazy copy links as the selected lazy copy link, thereby also designating a selected target feature structure. Next, during step 176 processor 31 discovers whether the selected target feature structure includes any lazy copy links. If so, the selected target feature structure is activated. Processor 31 responds to this discovery by advancing to step 178 from step 176. Processor 31 expands the selected target feature structure by calling instructions 158. Expansion of the selected target feature structure may result in more than one feature structure. If so, all but one of these feature structures are placed on the agenda to be processed later. Once the target feature structure is adequately specified, processor 31 advances to step 180 either from step 178 or step 176.

During step 180 processor 31 copies up into the original of the selected feature structure relevant information from one of the feature structures resulting from expansion of the target feature structure, one attribute at a time. Each attribute copied up has as its value a lazy copy link back to that attribute's value within the target feature structure. Where an attribute from the target feature structure matches those of the activated feature structure within the original of the selected feature structure, the attribute values are unified. If this unification activates one or more lazy copy links, then processor 31 expands the newly activated feature structure by calling instructions 158. Otherwise, when an attribute being copied up into the activated feature structure does not match a resident attribute, then that attribute is added to the activated feature structure with a lazy copy link back to the value of target feature structure's attribute. That done, processor 31 exits step 180 and advances to step 182.

During step 182 processor 31 deactivates the selected lazy copy link by removing it from the activated feature structure within the original of the selected feature structure. Afterward, processor 31 returns to step 160 to determine whether expansion of the activated feature structure is complete. Once expansion of the activated feature structure is complete, processor 31 advances to step 190 and returns control to the routine that called instructions 158.

C. Example of Lazy DNF Unification

Figure 8:
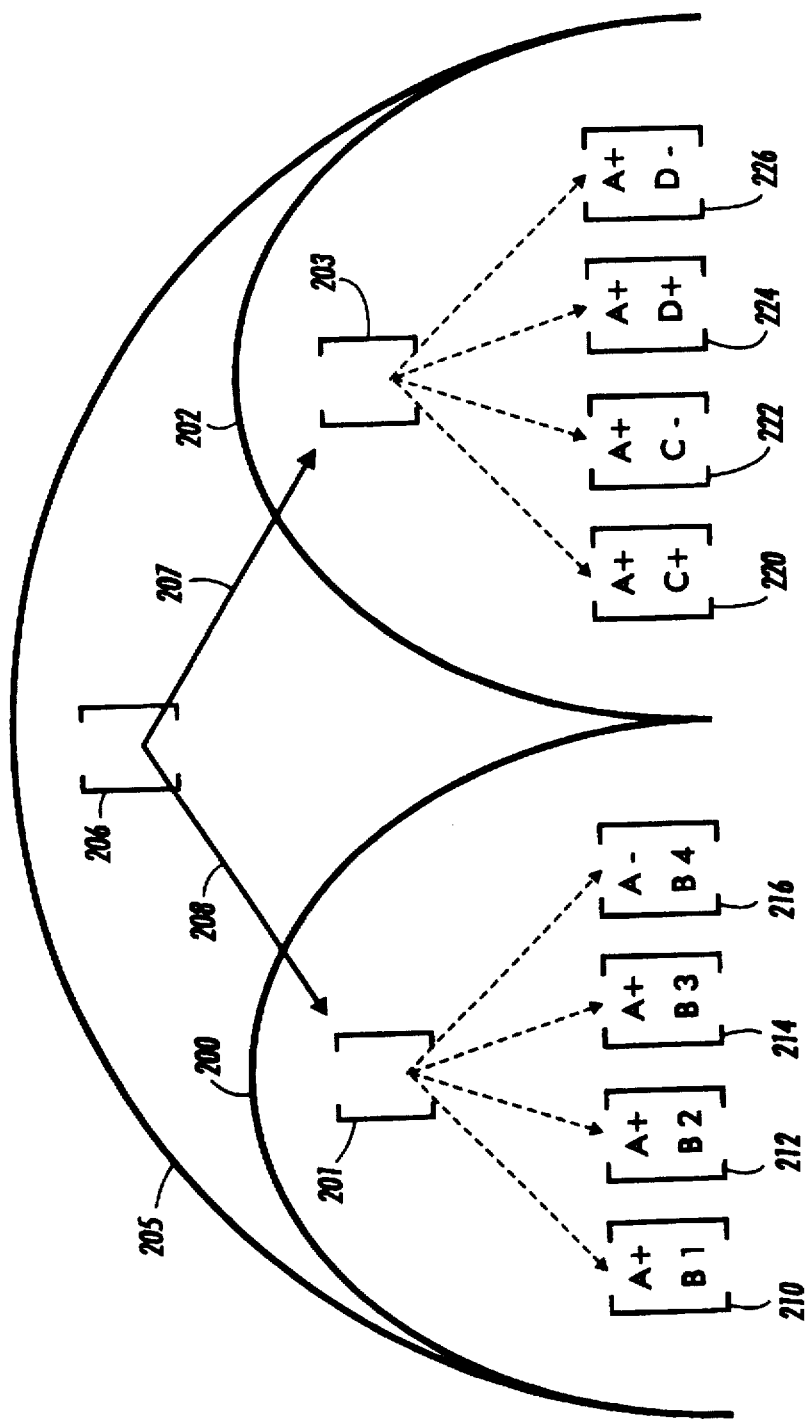
FIG. 8 illustrates a chart for the unification of two sister constituents at a first stage.

FIGS. 8–14 illustrate how lazy DNF unification works. Lazy DNF unification begins in FIG. 8 with two constituents 200 and 202, whose feature structures 201 and 203 are to be conjoined. Constituents 200 and 202 each include a number of alternative conjunctive feature structures. Conjunctive feature structures 210, 212, 214, and 216 are alternatives for feature structure 201, while conjunctive feature structures 220, 222, 224, and 226 are alternatives for feature structure 203. Feature structures 210, 212, 214, 216, 220, 222, 224, and 226 could come from lexical and/or phrasal ambiguities. An empty disjunctive feature structure is assigned to each constituent, with disjunctive lazy copy links to the conjunctive feature structures (the disjunctive lazy copy links are shown as dotted arrows). FIG. 8 represents the situation where everything has been truncated, and so all of the conjunctive feature structures are equivalent. In mother constituent 205, disjunctive feature structures 201 and 203 are unified using standard lazy copying. This produces feature structure 206 with interacting lazy copy links 207 and 208. The two interacting lazy copy links trigger an expansion of feature structure 206, which requires expansion of daughter feature structures 201 and 203.

Figure 9:
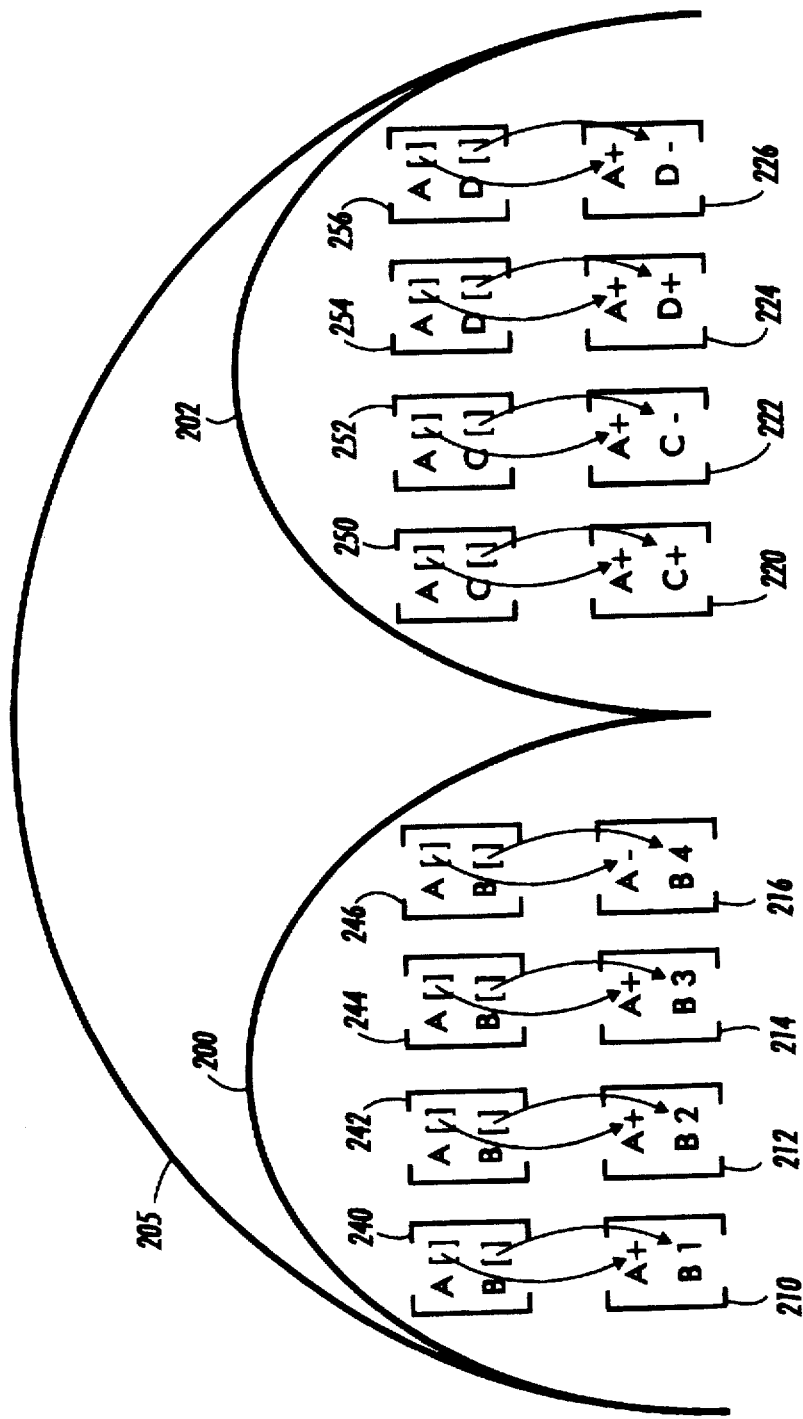
FIG. 9 illustrates a chart for the unification of two sister constituents at a second stage.

In FIG. 9 disjunctive feature structures 201 and 203 have been expanded, producing four partial copies 240, 242, 244, and 246 for daughter edge 200 and four partial copies 250, 252, 254, and 256 for daughter edge 202. Each partial copy has lazy copy links under each attribute pointing back to the original values. Note that except for the lazy copy links, many of the partial copies are identical.

Figure 10:
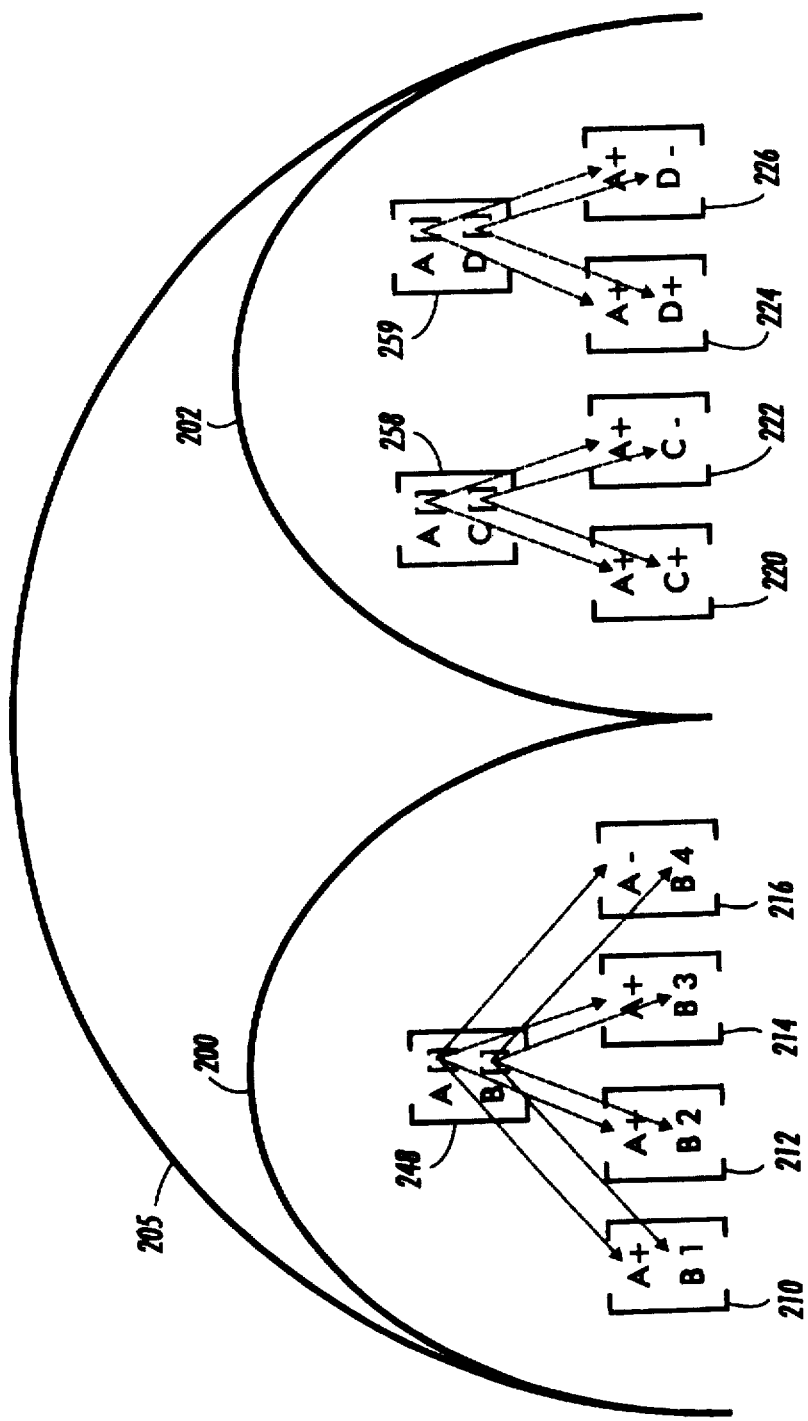
FIG. 10 illustrates a chart for the unification of two sister constituents at a third stage.

In FIG. 10 the identical partial copies have been merged together. This produces one disjunctive feature structure 248 for constituent 220 and two disjunctive feature structures 258 and 259 for constituent 202. The lazy copy links have also been merged, producing disjunctive lazy copy links, which are again, shown as dotted arrows. The reduction of feature structures resulting from this merge speeds up subsequent unifications involving constituents 200 and 202.

Figure 11:
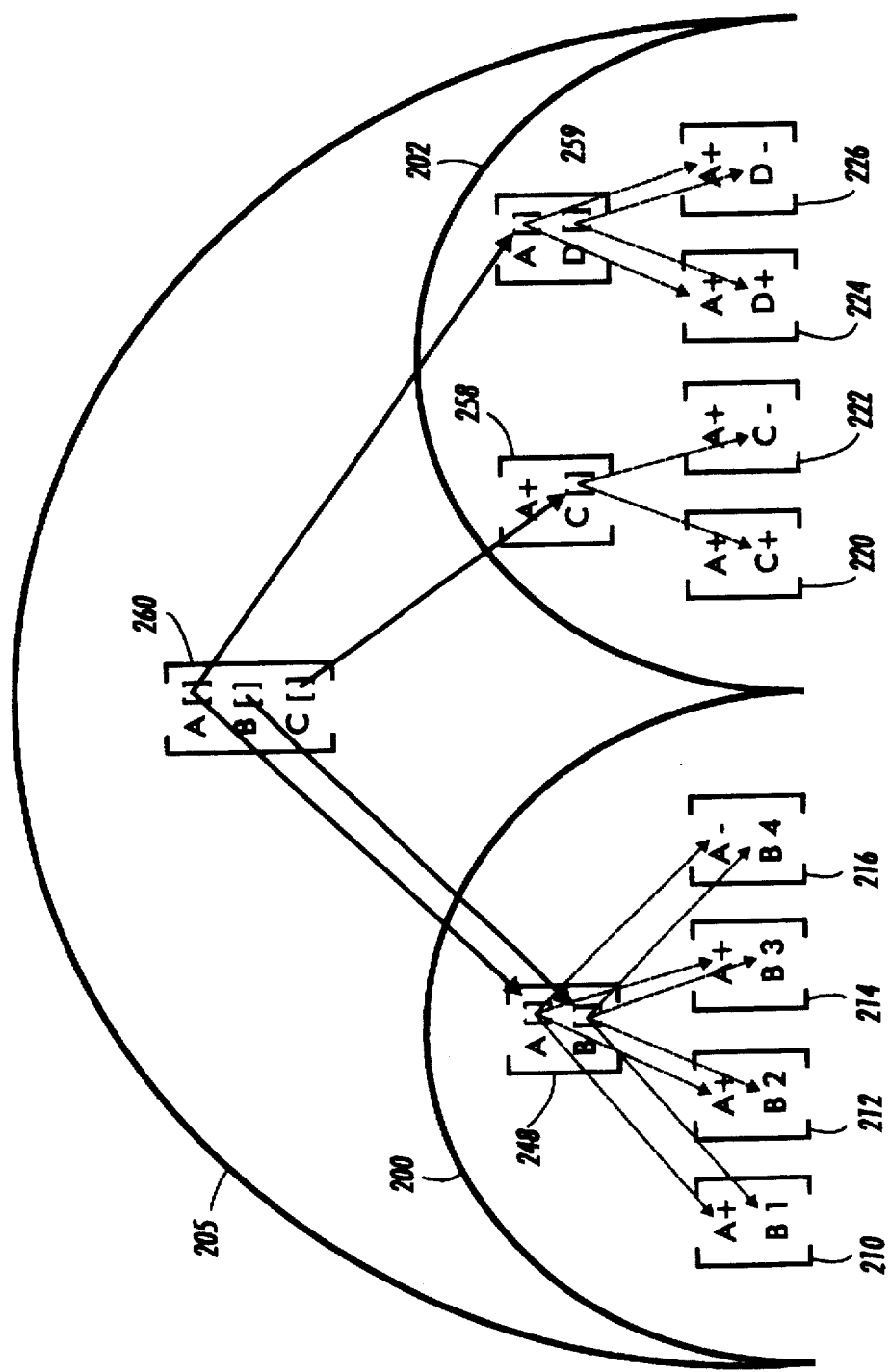
FIG. 11 illustrates a chart for the unification of two sister constituents at a fourth stage.

FIG. 11 illustrates the partial expansion of feature structure 206 given expanded feature structures for constituents 200 and 202. The unification of constituents 200 and 202 begins by taking the cross-product of the feature structures of daughters 200 and 202. The first result of this is feature structure 260 with attributes A, B, and C with lazy copy links to represent the value of each attribute. Because two conjunctive lazy copy links represent the value of the A attribute in feature structure 260, the value of the A attribute will have to be expanded. However, because the lazy copy links involved point to disjunctive values, the disjunctive values will have to be expanded first.

Figure 12:
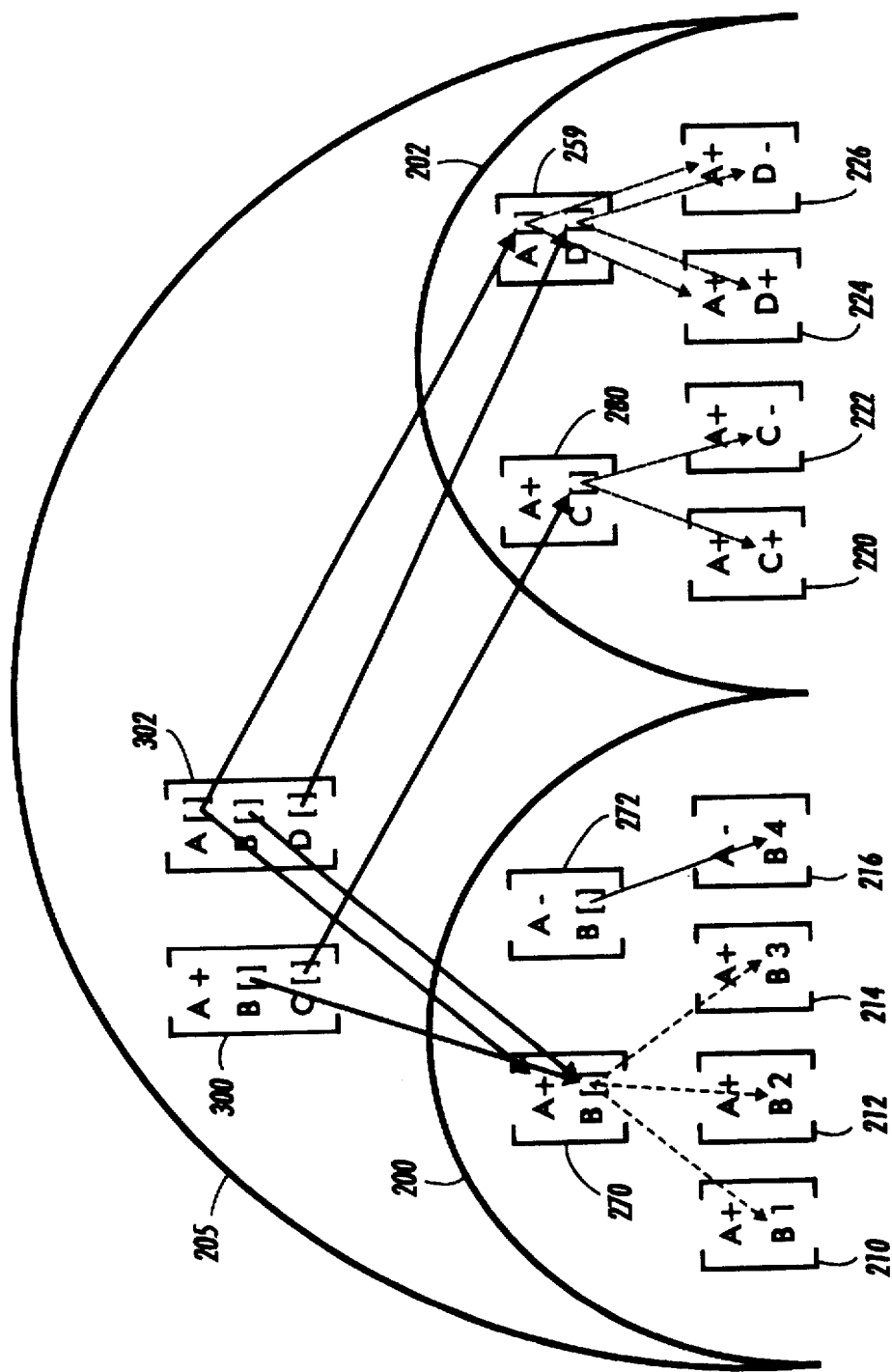
FIG. 12 illustrates a chart for the unification of two sister constituents at a fifth stage.

FIG. 12 illustrates the expansion of the A attributes of feature structures 248 and 258. Expansion produces four new partial copies for constituent 200 and two partial copies for constituent 202. The four partial copies associated with constituent 200 have been merged into two feature structures 270 and 272. Feature structure 270 represents the three feature structures whose value of the A attribute is + and feature structure 272 represents the feature structure in which A=-. The two partial copies of constituent 202 have been merged to create feature structure 280. This reduction in the number of feature structures used to represent constituents 200 and 202 reduces processing time in context free situations. With these expanded, truncated daughter feature structures, cross-product unification resumes by unifying feature structures 270 and 280. This produces feature structure 300, which shows no interaction between lazy copy links. The unification of feature structures 270 and 259 produces feature structure 302, in which there is interaction between lazy copy links associated with the values of the A attribute. Thus, the A attribute in feature structure 302 will have to be expanded.

Figure 13:
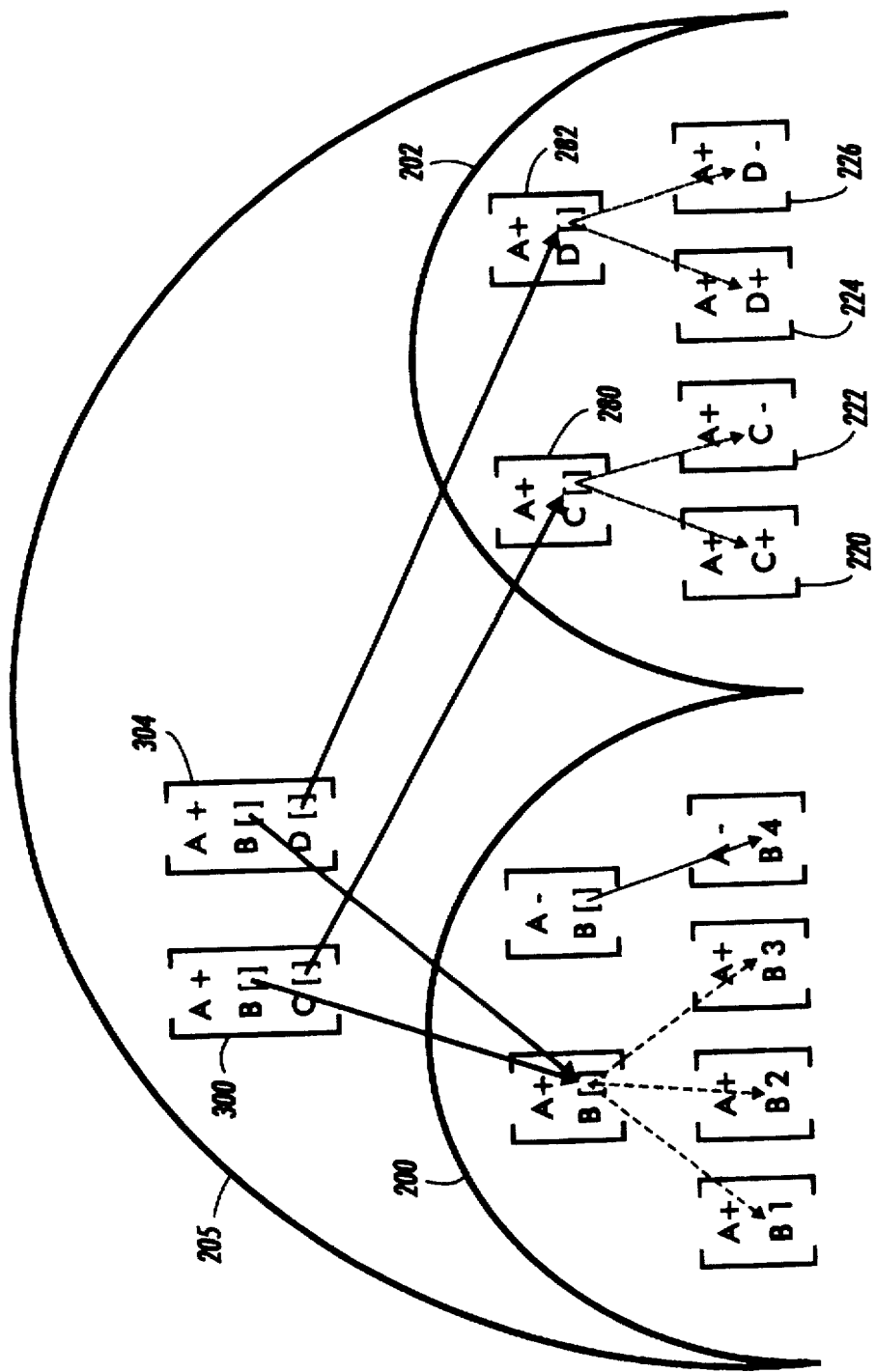
FIG. 13 illustrates a chart for the unification of two sister constituents at a sixth stage.

FIG. 13 illustrates the resulting expansion and unification. Expansion of feature structure 259 produced feature structure 282. Unification of feature structure 282 with feature structure 270 yields feature structure 304. Because the attributes of feature structure 304 differ from those of feature structure 300, the two feature structures cannot be merged. Unification of the feature structures associated with constituents 200 and 202 can now resume.

Figure 14:
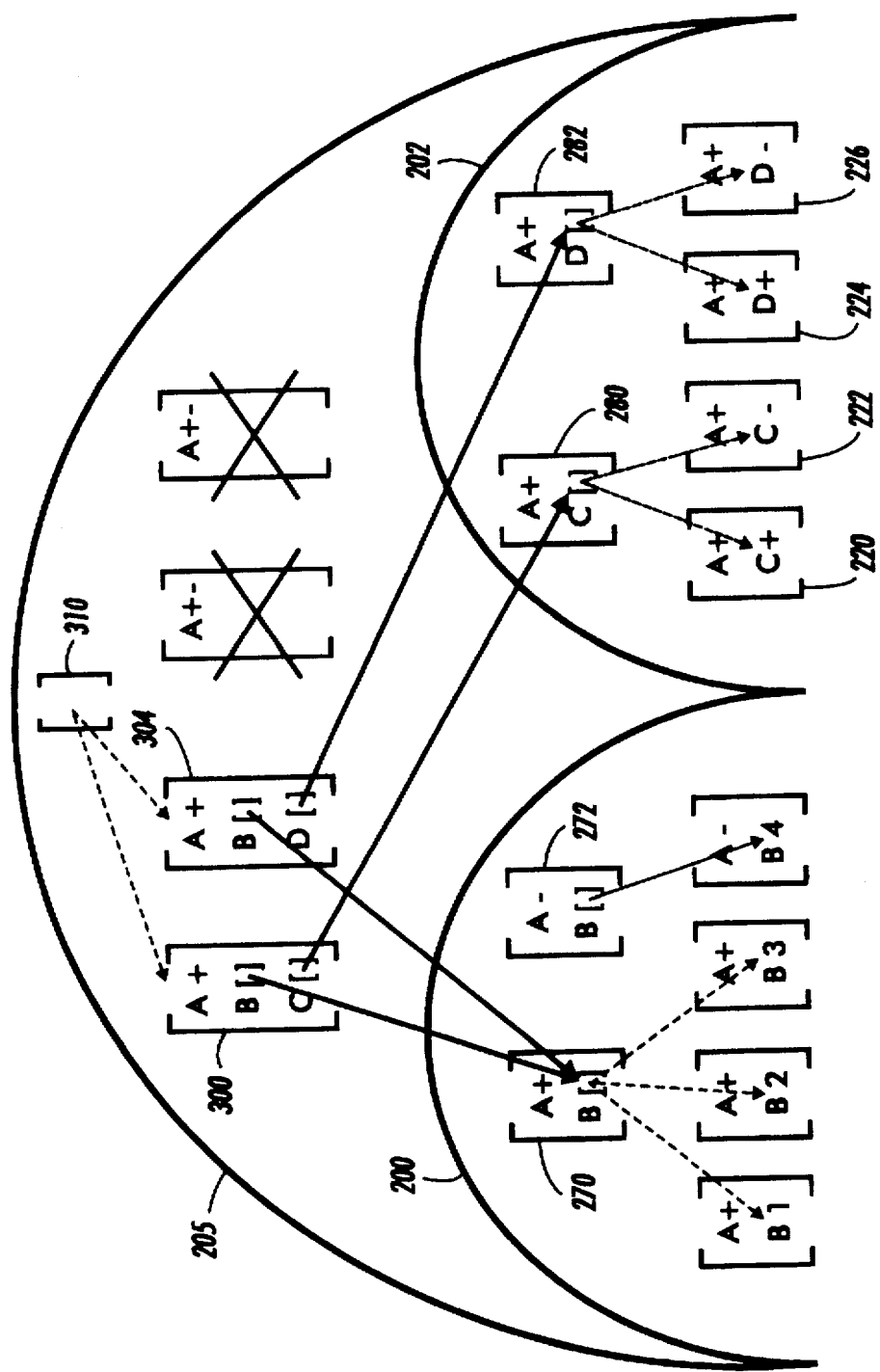
FIG. 14 illustrates a chart for the unification of two sister constituents at a seventh stage.

Unification of constituents 200 and 202 resumes by taking the cross product of feature structure 272 with feature structures 280 and 282. FIG. 14 illustrates the state of affairs after completing these unifications, which fail because their A attributes have inconsistent values. This leaves two valid feature structures that cannot be merged together. To represent these two alternative feature structures empty feature structure 310 is created with lazy copy links to feature structures 300 and 304. Unification of constituents 200 and 202 is thus complete until it is discovered at some later time that there is interaction with the lazy copy links of feature structure 300 or 304. As before, only the attribute values involved in the interaction will be expanded. By deferring the copying up of information until an interaction occurs, the parsing method reduces the number of feature structures necessary to represent each constituent and so takes advantage of context-freeness to reduce parsing to cubic time where possible. In this example, if the method of the present invention had not been used, twelve feature structures would have been produced, instead of two.

D. Conclusion

Thus, a method of parsing a unification based grammar in cubic time using disjunctive lazy copy links has been described. The method begins with unification of two daughter feature structures to generate their mother feature structure. Lazy copy links point from the mother feature structure back to her daughter feature structures. If unification activates any of these lazy copy links, then a selected one of the two daughter feature structures is expanded. Expansion of a disjunctive feature structure generates a number of alternative feature structures. The alternative feature structures are examined to determine if their number can be reduced by replacing multiple feature structures with one feature structure having multiple disjunctive lazy copy links, each disjunctive lazy copy link pointing to an alternative value. Two or more feature structures can be merged together if they have the same attributes and attribute values. Merging complete, unification of the two daughter feature structures resumes, an attribute at a time, at the point the unification halted for expansion. Whenever the unification of an attribute activates a lazy copy link, expansion is again triggered. The process of expanding, merging, and unifying is repeated until a mother feature structure is generated that includes no activated lazy copy links.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of parsing a language string using a unification based grammar that includes disjunctive lazy copy links, the method being executed by a processor coupled to a memory storing instructions for implementing the method, the method comprising the steps of:

a) unifying a first disjunctive feature structure associated with a first constituent and a second disjunctive feature structure associated with a second constituent to generate a third feature structure associated with a third constituent, the first disjunctive feature structure having a first attribute and two disjunctive lazy copy links, each disjunctive lazy copy link pointing to an alternative value of the first attribute, the third feature structure being underspecified and having a first lazy copy link to the first disjunctive feature structure;

b) if unification activates the first lazy copy link, expanding the specification of the first disjunctive feature structure to generate a first multiplicity of alternative feature structures, each of the first multiplicity of alternative feature structures being further specified than the first disjunctive feature structure and having at least one attribute, each attribute having a value;

c) if possible, reducing the first multiplicity of alternative feature structures to a first minimum of first disjunctive feature structures by merging together those of the first alternative feature structures having a first set of identical attributes to create a one of the first minimum disjunctive feature structures, the one of the first minimum disjunctive features having the first set of identical attributes and having at least a pair of disjunctive lazy copy links pointing to alternative values within the alternative feature structures merged together; and d) unifying the first minimum of first feature structures with the second feature structure to increase the level of specification of the third feature structure, the third feature structure having at least one lazy copy link to the first feature structures.

2. The method of claim 1 further comprising the step of:

e) if a one of the lazy copy links from the third feature structure to the first minimum of first feature structures is activated:

1) expanding a one of the first minimum of first feature structures pointed to by the one of the lazy copy links into a second multiplicity of first alternative feature structures;

2) if possible, reducing the second multiplicity of first alternative feature structures to a second minimum of first feature structures by merging together those of the second multiplicity of first feature structures having a second set of identical attributes to generate a one of the second minimum of first feature structures, the one of the second minimum of first feature structures having the second set of identical attributes and at least a pair of disjunctive lazy copy links pointing to alternative values within the second multiplicity of first alternative feature structures;

3) unifying the second minimum of first feature structures with the second feature structure to increase the level of specification of the third feature structure, the third feature structure having lazy copy links to the first feature structures;

4) if a one of the lazy copy links from the third feature structure to a one of the second minimum of first feature structures is activated, repeating steps e1) through e3) until the third feature structure includes only non-activated lazy copy links.

3. An article of manufacture comprising:

a) a memory; and b) instructions stored in the memory, the instructions representing a method of parsing a natural language string using a unification based grammar that includes disjunctive lazy copy links to take advantage of context-freeness, the method being executed by a processor coupled to the memory, the method comprising the steps of:

1) unifying a first disjunctive feature structure associated with a first constituent and a second disjunctive feature structure associated with a second constituent to generate a third feature structure associated with a third constituent, the first disjunctive feature structure having a first attribute and two disjunctive lazy copy links, each disjunctive lazy copy link pointing to an alternative value of the first attribute, the third feature structure being underspecified and having a first lazy copy link to the first disjunctive feature structure;

2) if unification activates the first lazy copy link, expanding the specification of the first disjunctive feature structure to generate a first multiplicity of alternative feature structures, each of the first multiplicity of alternative feature structures being further specified than the first disjunctive feature structure and having at least one attribute, each attribute having a value;

3) if possible, reducing the first multiplicity of alternative feature structures to a first minimum of first disjunctive feature structures by merging together those of the first alternative feature structures having a first set of identical attributes to create a one of the first minimum disjunctive feature structures, the one of the first minimum disjunctive features having the first set of identical attributes and having at least a pair of disjunctive lazy copy links pointing to alternative values within the alternative feature structures merged together; and 4) unifying the first minimum of first feature structures with the second feature structure to increase the level of specification of the third feature structure, the third feature structure having at least one lazy copy link to the first feature structures.

* * * * *